United States Patent Office 3,501,269
Patented Mar. 17, 1970

3,501,269
PROCESS FOR PREPARING SILICA GEL
Milton E. Winyall, Ellicott City, and Ellsworth G. Acker, Baltimore, Md., assignors to W. R. Grace & Co., New York, N.Y., a corporation of Connecticut
No Drawing. Filed Apr. 20, 1967, Ser. No. 632,172
Int. Cl. C01b *33/16, 33/00*
U.S. Cl. 23—182          7 Claims

ABSTRACT OF THE DISCLOSURE

A commercial process of preparing intermediate density silica gel, which process is characterized by a unique aging and washing step which only requires as little as one-tenth of the amount of time required by the corresponding steps of the processes of the prior art. The product produced has wide application particularly as a filter in varnishes, lacquers, paper, etc.

---

This invention relates to a novel process of preparing intermediate density silica gel. In particular, this invention relates to a slurry process which can readily be adapted to large scale commercial production. Our process further produces a desirably uniform product and in one embodiment produces a fine-sized silica gel.

The prior art method of making intermediate density silica gel is characterized by an initial acid forming step wherein a hard bulk hydrogel is formed, followed by a subsequent time consuming and tedious washing and aging step with an ammonia solution. Normally the prior art aging and washing step requires from 36 to 44 hours as contrasted with our novel method which requires a total aging, spray drying and washing time of approximately 4 hours. Our process is further notably distinguished from the prior art process in that in the initial step we do not produce a hard bulk hydrogel but rather a soft hydrogel having the final form of the pores already formed, as contrasted with the prior art in which the pores must be reformed in the final aging step.

Considering our novel process now in more detail, a specific mode of our method may be effected by first preparing a sodium silicate solution having a $SiO_2$ concentration of from 7.5 to 20 weight percent; normally any grade of commercial sodium silicate may be used as the initial starting material. The sodium silicate solution is then prepared by dissolving the desired amount of sodium silicate in sufficient deionized water to prepare the solution within the concentration limits noted above. A 3.5 to 7.0 weight percent sulfuric acid solution is prepared by diluting concentrated sulfuric acid with deionized water. The sulfuric acid solution is then added to the sodium silicate solution with constant stirring. The quantities and concentrations of these solutions must be carefully adjusted such that the pH of the resulting hydrosol is from about 9.8 to 10.4. The temperature of the respective solutions must be also carefully controlled, usually within the range of from 25 to 50° C., such that the gelation of the hydrosol normally occurs within 1 to 20 minutes, forming a hydrosol slurry. The slurry is then aged for 2 to 60 minutes, after which sufficient 5 to 15% sulfuric acid solution is added to bring the pH of the slurry down to from 2.0 to 3.0. Other concentrations of sulfuric acid may be used, provided the resulting pH's are within the range 2–3. The slurry is then further aged for 5 to 300 minutes with continuous stirring and at ambient temperature without any additional heat transfer steps. After this aging step, sufficient aqua ammonium hydroxide is added to the slurry to increase the pH to about 8. The slurry is then given a final aging step lasting from ½ to 4 hours at a temperature from 25 to 90° C. The slurry is then filtered and dried for 16 hours at about 150 to 200° C.

It has further been found that the surface area of the product may be lowered and the pore size distribution broadened by increasing the final aging temperature, but that better regulation or uniformity of the product may be obtained by varying the final aging temperatures within the limits of from 25 to 50° C.

In a preferred embodiment the gel is spray dried, the final aging step is effected at from 70 to 90° C., preferably 75° C., at a pH of 9.5 to 10.5, preferably 10, for 2 to 5 hours, normally approximately 3 hours. The slurry is then given a conventional spray drying treatment, followed with washing and then drying in the same manner as above. Alternatively, the slurry may be filtered and then reslurried prior to spray drying.

It should be stressed that in either embodiment, the pH of the first gelation step must be approximately 10. If the pH is varied above the limits set forth above, the gel will have a significantly higher pore volume than desired. Similarly, when the aging of the initial gelation step is continued beyond the limits set forth above, the surface of the area of the product is reduced below desirable limits. Further, the final ammonia aging step also affects surface area and pore size distribution, as does the particular mode of drying. Thus, in order to obtain a product having the desired surface area and pore size distribution and density, all these variables must be considered and carefully controlled.

Our invention may be further illustrated by the following exemplary but non-limiting examples.

EXAMPLE I

This example illustrates our inventive method of producing an intermediate density silica gel. Broadly, our process can be considered to consist of three steps, (1) and initial hydrogel forming step, (2) and acid treatment step and (3) an ammoniation step.

In effecting the first step of our process, a 10% $SiO_2$ sodium silicate solution was prepared by diluting the required amount of commercial sodium silicate with deionized water. 1300 ml. of the silicate solution and 1170 ml. of the acid solution were then admixed together with constant stirring at a temperature of 23° C. The pH of the admixed solution was observed to be 10.0. A set time of 8 minutes was required to form the hydrogel slurry. The slurry was then aged for 15 minutes.

The second step of our process was effected by adding an acid solution consisting of 25 ml. of 96% sulfuric acid in 400 ml. of deionized water to the slurry with stirring. The slurry was then aged 15 minutes with stirring, no attempt being made to control the temperature. The pH and temperature of the slurry was observed to be 2.05 and 22° C. respectively.

The third step of our process was effected by raising the pH of the slurry to 8.15 by the addition of aqua ammonium hydroxide (approximately 50 ml. were required). The slurry was then aged for 3½ hours at a temperature of 25° C. After aging, the slurry was filtered and the resulting silica gel filter cake was oven dried overnight at 150° C. After drying, the silica gel was ground and given successive washes with 1000 ml. of water; followed by a final washing with 1500 ml. of deionized water. The washed silica gel was then dried overnight at 50° C. and then activated by heating at 200° C. for about 3 hours.

The surface area and pore volume were determined by standard Brunauer, Emmett, Teller methods using nitrogen and found to be 297 m.²/g. and 1.05 cc./g.

EXAMPLE II

Eight additional examples were run following the same procedure as set forth with respect to Example I but varying the pH's or aging time or temperature and method of drying of the respective slurries. The particular variables used and the results of these examples are summarized in the following table.

TABLE I

| Example | I | II | III | IV | V | VI | VII | VIII | IX |
|---|---|---|---|---|---|---|---|---|---|
| Step I: | | | | | | | | | |
| Temp. (° C.) | 23 | 23 | 23 | 23 | 23 | 45 | 24 | 28 | 25 |
| pH | 10.0 | 9.8 | 9.9 | 10.1 | 10.0 | 10.4 | 9.8 | 9.9 | 10.05 |
| Set time (min.) | 8 | 4 | 3 | 3 | 3 | 3 | 4 | 2.5 | 2.5 |
| Aging time (min.) | 15 | 15 | 15 | 15 | 15 | 15 | 60 | 15 | 15 |
| Step II: | | | | | | | | | |
| Temp. (° C.) | 23 | 23 | 23 | 23 | 23 | 23 | 24 | 30 | 32 |
| pH | 2.05 | 2.2 | 2.1 | 1.9 | 2.05 | 2.15 | 2.2 | 1.8 | 2.15 |
| Aging time (min.) | 15 | 15 | 15 | 15 | 15 | 15 | 15 | 15 | 15 |
| Step III: | | | | | | | | | |
| Temp. (° C.) | 25 | 75 | 25 | 75 | 75 | 25 | 25 | 30 | 73 |
| Aging time (hrs.) | 3½ | ½ | ½ | 3½ | ½ | ½ | ½ | ½ | 3 |
| Dry-type | Oven | Oven | Oven | Oven | Oven | Oven | Oven | Spray | Spray |
| pH | 8.15 | 8.0 | 8.2 | 9.6 | 10.2 | 10.1 | 8.0 | 8.0 | 9.7 |
| Surface area | 297 | 279 | 301 | 212 | 235 | 194 | 238 | 560 | 320 |
| Pore volume | 1.05 | 1.00 | 1.05 | 1.05 | 0.95 | 0.90 | 0.95 | 1.00 | 115 |

In each of the above examples, an intermediate silica gel product having a bulk density ranging from .37 to .54 for granular material (this is approximately equivalent to about 0.20 to 0.35 g./cc. for a fine powder form of the product) and comparable in quality to the products produced by the long term aging processes of the prior art, was produced. This density range should not be considered as limiting but rather merely as exemplary, as the density can be controlled over wide ranges by varying the type of drying (e.g., spray or oven) and through the particular grinding, and the like, treatments given the product.

As can be seen from the above table, the longest total aging time used in any of the examples is 4 hours. This, thus, represents a considerable advantage over the prior art processes which require anywhere from 36 to 48 hours aging.

Obviously many modifications and variations of our invention may be made without departing from the essence of our invention.

What we claim is:

1. A quick aging process of making intermediate density silica gel having a pore volume of 0.90 to 1.15 cc./g. and a surface area of less than about 320 m.²/g. comprising:
    (a) providing a sodium silicate solution having a $SiO_2$ concentration of 7.5 to 20 weight percent,
    (b) providing a 3, 5 to 7.0 weight percent mineral acid solution,
    (c) admixing a controlled amount of the silicate solution and acid solution together with constant stirring at a temperature of 25 to 50° C. to provide an admixed solution having a pH of 9.8 to 10.4, wherein a hydrogel slurry is formed,
    (d) allowing the hydrogel slurry to set, aging the set hydrogel slurry for 2 to 60 minutes,
    (e) lowering the pH of the hydrogel slurry to a pH of from 2.0 to 3.0 and then aging the hydrogel slurry for 5 to 300 minutes at ambient temperature,
    (f) raising the pH of the hydrogel slurry to about 8 and then aging the hydrogel slurry for ½ to 4 hours, at a temperature of 25 to 90° C., whereby an intermediate density silica gel slurry is formed,
    (g) separating the silica gel from the slurry,
    (h) washing the silica gel,
    (i) drying the silica gel.

2. The process of claim 1 wherein the silica gel is dried by spray drying.

3. The process of claim 1 wherein the mineral acid is sulfuric acid.

4. The process of claim 1 wherein the pH is lowered in step (e) by the addition of a dilute mineral acid solution to the hydrogel slurry.

5. The process of claim 1 wherein the pH is raised in step (f) by the addition of a dilute ammonium hydroxide.

6. The process of claim 1 wherein the hydrogel slurry of step (f) is aged at a temperature of from 70–90° C.

7. The process of claim 1 wherein the hydrogel slurry of step (d) is aged for about 15 minutes, the hydrogel slurry of step (e) is aged for about 15 minutes and the hydrogel slurry of step (f) is aged from ½ to 3½ hours.

References Cited

UNITED STATES PATENTS 2,462,236  2/1949  Thomas _____ 23—182

EDWARD STERN, Primary Examiner